United States Patent
Nandoori et al.

(10) Patent No.: US 10,432,675 B2
(45) Date of Patent: Oct. 1, 2019

(54) COLLISION PREVENTION IN SECURE CONNECTION ESTABLISHMENT

(71) Applicant: Microsoft Technology Licensing, LLC, Redmond, WA (US)

(72) Inventors: Ashok Nandoori, Sammamish, WA (US); Abhishek Tiwari, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 15/488,822

(22) Filed: Apr. 17, 2017

(65) Prior Publication Data

US 2018/0302448 A1 Oct. 18, 2018

(51) Int. Cl.
*G06F 15/173* (2006.01)
*H04L 29/06* (2006.01)
*G06F 15/16* (2006.01)

(52) U.S. Cl.
CPC ........ *H04L 65/1069* (2013.01); *H04L 63/061* (2013.01); *H04L 63/164* (2013.01); *H04L 63/0272* (2013.01); *H04L 63/08* (2013.01); *H04L 63/205* (2013.01)

(58) Field of Classification Search
CPC .......................... H04L 63/0272; H04L 63/061
USPC ....................................................... 709/224
See application file for complete search history.

(56) References Cited

U.S. PATENT DOCUMENTS

| 7,747,021 B2 * | 6/2010 | Lindteigen ........ H04L 29/06027 380/270 |
| 9,596,077 B2 | 3/2017 | Johnson et al. |
| 2005/0239497 A1 * | 10/2005 | Bahl .................. H04L 12/5692 455/552.1 |

(Continued)

FOREIGN PATENT DOCUMENTS

| CN | 104410610 A | 3/2015 |
| JP | H06244898 A | 9/1994 |

(Continued)

OTHER PUBLICATIONS

"[IPsec] Collison During Initial Exchange-RFC 5996", Retrieved from <<http://www.ietf.org/mail-archive/web/ipsec/current/msg07333.html>>, Dec. 16, 2011, 3 Pages.

(Continued)

*Primary Examiner* — Karen C Tang
(74) *Attorney, Agent, or Firm* — Ogilvie Law Firm

(57) ABSTRACT

To reduce network connectivity downtime while connections are established or re-established after maintenance, a connection request that would be rejected is instead accepted, even though a corresponding outgoing request is still pending. In some cases, the connection request is a secure connection request, such as an INIT phase request or an AUTH phase request during an Internet Key Exchange protocol exchange. Single-ended and double-ended configurations are both presented. When colliding INIT attempts succeed, two results are produced, after which one may be selected and the other discarded. Alternately, both INIT results may be used in producing two security associations during a subsequent AUTH phase. Incoming traffic and outgoing traffic may then use respective security associations.

20 Claims, 7 Drawing Sheets

EXAMPLE 7: COLLIDING INIT ATTEMPTS, BOTH SUCCEED
(INIT ENHANCEMENT IS USED AT NODE X
TO OK YINITREQ WHILE XINITREQ IS PENDING, AND
INIT ENHANCEMENT IS USED AT NODE Y
TO OK XINITREQ WHILE YINITREQ IS PENDING,
THEN EACH NODE SELECTS AN INIT EXCHANGE
WHOSE RESULT WILL BE USED IN UPCOMING AUTH)
(OVERVIEW DIAGRAM)

(56) References Cited

U.S. PATENT DOCUMENTS

| | | | |
|---|---|---|---|
| 2010/0020689 A1* | 1/2010 | Tang | H04L 47/10 370/235 |
| 2012/0030751 A1 | 2/2012 | Datta et al. | |
| 2012/0066399 A1 | 3/2012 | Marquardt et al. | |
| 2012/0163265 A1 | 6/2012 | Kotecha et al. | |
| 2013/0107788 A1* | 5/2013 | Cherian | H04W 72/005 370/312 |
| 2013/0308530 A1* | 11/2013 | Yang | H04W 8/22 370/328 |
| 2014/0317405 A1* | 10/2014 | Johnson | H04L 63/0227 713/164 |
| 2014/0317720 A1* | 10/2014 | Johnson | H04L 63/0227 726/14 |
| 2014/0325066 A1 | 10/2014 | Gupta et al. | |
| 2015/0117269 A1* | 4/2015 | Navalekar | H04L 5/143 370/277 |
| 2015/0245282 A1* | 8/2015 | Kim | H04W 48/14 370/338 |
| 2016/0255458 A1* | 9/2016 | Huang | H04W 4/70 370/338 |
| 2016/0380984 A1* | 12/2016 | Johnson | H04L 63/0485 713/153 |
| 2017/0353867 A1* | 12/2017 | Baboescu | H04W 76/10 |
| 2018/0189328 A1* | 7/2018 | Frazier | G06F 16/25 |
| 2019/0014598 A1* | 1/2019 | Yoshimura | H04W 16/14 |

FOREIGN PATENT DOCUMENTS

| | | |
|---|---|---|
| JP | 2011254222 A | 12/2011 |
| JP | 2012231429 A | 11/2012 |
| WO | 2014153989 A1 | 10/2014 |

OTHER PUBLICATIONS

"International Search Report and Written Opinion Issued in PCT Application No. PCT/US2018/026351", dated Jun. 28, 2018, 11 Pages.

Tan, et al., "A new free-access collision resolution algorithm based connection request procedure for land mobile satellite systems", In Proceedings of the Eighth Annual Joint Conference of the IEEE Computer and Communications Societies. Technology: Emerging or Converging, Apr. 23, 1989, pp. 1057-1062.

"IPsec", retrieved from <<https://en.wikipedia.org/wiki/IPsec>>, 10 pages, Mar. 9, 2017.

"Internet Key Exchange Protocol Version 2 (IKEv2)", [RFC 7296], retrieved from <<https://tools.ietf.org/html/rfc7296>>, 143 pages, Oct. 2014.

"Kerberized Internet Negotiation of Keys", retrieved from <<https://en.wikipedia.org/wiki/Kerberized_Internet_Negotiation_of_Keys>>, 3 pages, Apr. 1, 2016.

"Internet Key Exchange", retrieved from <<https://en.wikipedia.org/wiki/Internet_Key_Exchange>>, 6 pages, Mar. 19, 2017.

* cited by examiner

EXAMPLE 2: SUCCESSFUL INIT, SUCCESSFUL AUTH
(INIT AND AUTH ENHANCEMENTS NOT USED)
(DETAILED DIAGRAM)

EXAMPLE 2: SUCCESSFUL INIT, SUCCESSFUL AUTH
(INIT AND AUTH ENHANCEMENTS NOT USED)
(OVERVIEW DIAGRAM)

EXAMPLE 3: COLLIDING INIT ATTEMPTS FAIL
(INIT ENHANCEMENT NOT USED)
(OVERVIEW DIAGRAM)

EXAMPLE 4: COLLIDING INIT ATTEMPTS FAIL
(INIT ENHANCEMENT NOT USED)
(OVERVIEW DIAGRAM)

EXAMPLE 5: COLLIDING INIT ATTEMPTS, ONE SUCCEEDS
(INIT ENHANCEMENT IS USED AT NODE X,
TO OK YINITREQ WHILE XINITREQ IS PENDING)
(OVERVIEW DIAGRAM)

EXAMPLE 6: COLLIDING INIT ATTEMPTS, ONE SUCCEEDS
(INIT ENHANCEMENT IS USED AT NODE X,
TO OK YINITREQ WHILE XINITREQ IS PENDING)
(OVERVIEW DIAGRAM)

EXAMPLE 7: COLLIDING INIT ATTEMPTS, BOTH SUCCEED
(INIT ENHANCEMENT IS USED AT NODE X
TO OK YINITREQ WHILE XINITREQ IS PENDING, AND
INIT ENHANCEMENT IS USED AT NODE Y
TO OK XINITREQ WHILE YINITREQ IS PENDING,
THEN EACH NODE SELECTS AN INIT EXCHANGE
WHOSE RESULT WILL BE USED IN UPCOMING AUTH)
(OVERVIEW DIAGRAM)

EXAMPLE 8: COLLIDING INIT ATTEMPTS, BOTH SUCCEED
(INIT ENHANCEMENT IS USED AT EACH NODE),
THEN COLLIDING AUTH ATTEMPTS, BOTH SUCCEED
(AUTH ENHANCEMENT IS USED AT EACH NODE)
(OVERVIEW DIAGRAM)

COLLISION PREVENTION IN SECURE CONNECTION ESTABLISHMENT

BACKGROUND

Noon Computing networks include nodes which communicate over network connections. Each node includes at least a processor and a memory; a node may also include a display, other peripheral devices, special-purpose hardware, and other structures. Networked computers are nodes, and so are networked vehicles, buildings, devices and other items in the Internet of Things. The term "connection" is used broadly here to mean any network construct which sends or receives data between nodes. Connections may be free of low-level error checking, as with User Datagram Protocol (UDP) so-called "connectionless" transmission connections, or connections may be more reliable, as with Transmission Control Protocol (TCP) connections. Connections may be secured by authentication or by encryption mechanisms, or both, or neither. The nodes being connected may be part of a single Local Area Network (LAN), or they may reside in widely separated physical locations that communicate through a Wide Area Network (WAN) such as the Internet.

Without connections, networks have only severely limited usefulness. Although a given set of connections is often relatively easy to establish, the set of desired connections is not generally permanent. Connections are continually being established or re-established, to balance loads or provide redundancy, for example, or as nodes join a network, or after nodes restart their network software or reboot completely.

As computing networks continue to grow in size, in complexity, in flexibility, and in their fields of use, new kinds of connections emerge, as do new opportunities to benefit from connections. Accordingly, new technologies for reducing the time needed to establish or re-establish connections between network nodes are worth careful consideration.

SUMMARY

Some technologies described herein are directed to the technical activity of reducing network connectivity downtime by accepting connection requests that would conventionally be rejected, thus avoiding the congestion and delay of timeout and retry efforts that would follow such rejections. Technical mechanisms are described which accept an incoming request even though a corresponding outgoing request is still pending, for selecting between successful connection request results, for dividing traffic between security associations, and other examples. Other technical activities pertinent to teachings herein will also become apparent to those of skill in the art.

Some examples provided herein are directed to improved computer connection technology which prevents collisions by increasing acceptance of connection requests during pendency of other network connection requests. Consider two network nodes, designated here as node X and node Y, with each node having at least one processor, a memory in operable communication with the processor, and connection software residing at least partially in the memory and at least partially executable with the processor. Define "pending" status for a connection request to exist when (a) no response to the connection request has been received and processed by the node which sent the connection request, and (b) a maximum predetermined time (a.k.a. "timeout period") that the node will wait for such a response has not elapsed. Then in some examples of the teachings herein, the connection software of at least one of the network nodes provides a functionality enhancement of a connection protocol implementation, the enhancement allowing the network node to accept a connection request that was initiated by another node even though the accepting node's own connection request to that other node is still pending. In some examples, the connection request is a secure connection request, such as an INIT phase or AUTH phase request during an Internet Key Exchange protocol exchange.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
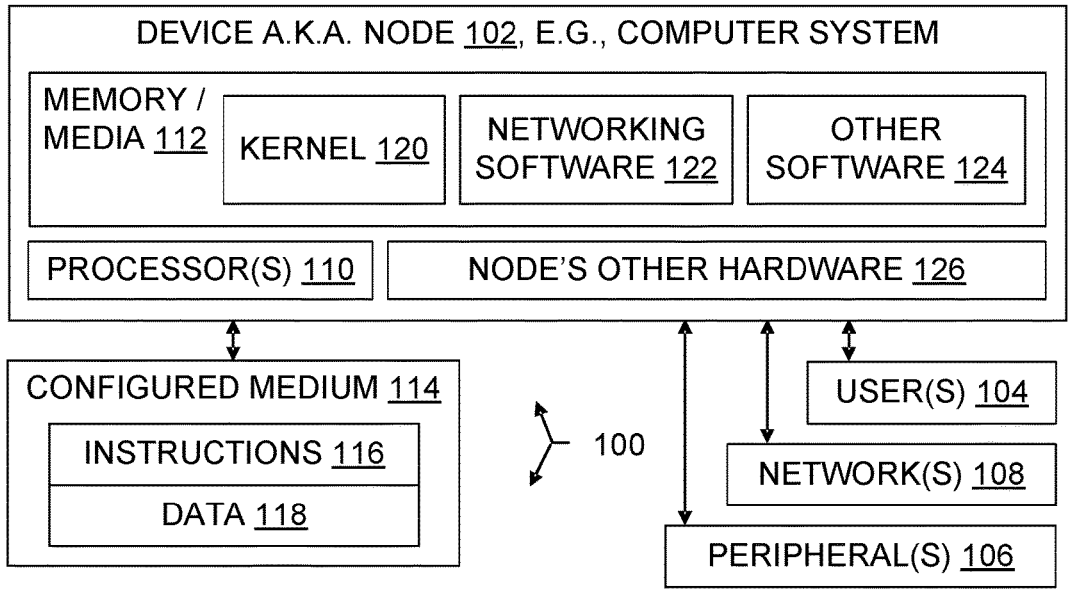
FIG. 1 is a block diagram illustrating a network node in the form of a computer system having at least one processor, at least one kernel such as an operating system, and at least one memory, and also illustrating a configured storage medium.

Large public cloud deployments may seek to handle all aspects of networking at scale. One result of scaling can be a myriad of applications and services spread across multiple sites. In such environments, it is perhaps inevitable that collisions of various kinds will occur.

One example of a collision impacts the ability to establish a secure connection between two peers, e.g., two nodes which reside in one or more networks. "Peer" is not limited herein to peer-to-peer networking; peers are simply nodes that share a connection, or will share one if a connection attempt that is underway succeeds.

During connection establishment, it is not unusual to have two network endpoints initiate connection requests at nearly the same time as each other. For a network protocol like IPsec using familiar implementations, this can result in each endpoint rejecting the other endpoint's connection initiation request (IKE INIT) and both IPsec endpoints backing off for a random time before attempting IPsec requests again. This is sometimes referred to as a "timeout and retry" operation or simply as a "retry operation".

A retry operation incurs delay, e.g., while nodes timeout waiting for a response or while nodes process a rejection response and wait a random time before retrying with another request. The additional traffic (e.g., rejections and repeated requests) present in a retry operation can cause or increase rejection. Indeed, the situation can get progressively worse as failed attempts make failure more likely by heavily loading the network and its nodes. In some situations, the probability of a collision happening is already very high, e.g., when planned maintenance forces multiple network devices to initiate new connection requests.

Some embodiments taught herein help network nodes avoid the retry back off completely, by accepting requests that familiar implementations would reject. Some embodiments prevent colliding attempts from becoming full collisions that incur the delay and possible network traffic and node processing congestion involved in retry operations. In some embodiments, each IPsec endpoint supports two logical security associations with each remote endpoint, namely, two main mode SAs, one for incoming traffic and another for outgoing traffic. This allows an IPsec endpoint to process an IKE INIT request received from a remote endpoint even when its own IKE INIT request is still in-progress.

This functionality enhancement may be single-ended or double-ended. That is, a node equipped with the enhancement may accept an incoming request while its own request is still pending, thus avoiding a collision, regardless of whether the node that sent the accepted request is likewise equipped to avoid collisions. If two IPsec endpoint nodes both support this collision avoidance functionality (i.e., double-ended scenario), then both might get two security associations established during clash, when requests from both endpoints come at the same time. In this event, each node is free to use any of the security associations for data traffic. If only one of the IPsec endpoints supports this innovation, then during a clash only one security association will be established, as the endpoint which does not support the functionality enhancement would reject the IPsec INIT request from the peer that does. Either way, providing implementation of the enhancement on even a subset of the nodes can provide benefits such as faster VPN connectivity for cloud networking and reduced network loads.

Some embodiments described herein may be viewed in a broader context. For instance, concepts such as acceptance, collisions, compatibility, pendency, rejection, and security may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving acceptance, collisions, compatibility, pendency, rejection, or security are outside the present scope. Accordingly, vagueness, mere abstractness, lack of technical character, and accompanying proof problems are also avoided under a proper understanding of the present disclosure.

Context of Efficiency Enhancements

Assume that a cloud network C provides services to an on-premises network O. The present inventors sought ways to reduce the downtime of network O after maintenance on network C. In theory, such downtime could be reduced in many different ways, such as decreasing the frequency of maintenance on C, increasing hardware capabilities in O or C or both (e.g., faster processors, more memory), increasing network capabilities for the O-C connection (e.g., to have more bandwidth and less latency), reducing the number of connections between O and C that need to be re-established after maintenance on C, and in many other ways.

Faced with too many possibilities to investigate them all, the inventors chose to focus on increasing the efficiency of re-establishing connections between O and C after maintenance on C. In particular, they chose to focus on collisions that delay the re-establishment of such connections. They identified certain shortcomings related to collisions, and devised ways to overcome them. These shortcomings occur in the way familiar implementations perform the INIT and AUTH phases of the establishment or re-establishment of secure connections which use Security Associations in virtual private networks (VPNs). The present document describes in detail how to overcome these shortcomings in that context.

However, one of skill will also understand that similar shortcomings may be found in other contexts. One example is contexts involving other connection protocol or network communication protocol implementations, which do not necessarily involve Security Associations. Another example is contexts that involve establishing VPN connections between two networks, regardless of whether one network is a cloud and the other is an on-premises network. One of skill will recognize that teachings illustrated here in the INIT-AUTH-Security Association-VPN context can also be applied to improve networking technology efficiency in these examples and other contexts by reducing collisions as taught herein.

Security Association Creation and Notation Enhancements

Understanding how Security Associations are created will assist in understanding the innovations described here, and in understanding the inventors' journey in creating those innovations. As mentioned, the O and C networks the inventors studied are connected by a virtual private network (VPN). VPNs use encryption to protect data transmitted between two or more locations. In many cases, the encryption is implemented using IPSec (Internet Protocol Security), which is an industry standard secure communications protocol. IPSec uses Security Associations, which are network constructs that describe the particular encryption algorithms, encryption keys, and other security attributes used for secure communications in a particular connection. Security Associations are typically established using Internet Security Association and Key Management Protocol (ISAKMP) with authenticated keying material. One of the most common ways to obtain authenticated keying material and set up a Security Association is to use the Internet Key Exchange (IKE) protocol.

Version 2 of the Internet Key Exchange (IKEv2) protocol is described in Internet Engineering Task Force (IETF) Request for Comments 7296 (RFC 7296). According to RFC 7296:

"All IKE communications consist of pairs of messages: a request and a response. The pair is called an 'exchange', and is sometimes called a 'request/response pair'. The first two exchanges of messages establishing an IKE SA are called the IKE_SA_INIT exchange and the IKE_AUTH exchange; subsequent IKE exchanges are called either CREATE_CHILD_SA exchanges or INFORMATIONAL exchanges. In the common case, there is a single IKE_SA_INIT exchange and a single IKE_AUTH exchange (a total of four messages) to establish the IKE SA and the first Child SA. In exceptional cases, there may be more than one of each of these exchanges. In all cases, all IKE_SA_INIT exchanges MUST complete before any other exchange type, then all IKE_AUTH exchanges MUST complete, and following that, any number of CREATE_CHILD_SA and INFORMATIONAL exchanges may occur in any order."

RFC 7296 provides notation and examples of INIT and AUTH phases of the IKE protocol. The RFC7296 notation and examples provide a departure point to one of skill in the art, but they are enhanced herein to help explain the present innovations. The following notation is from RFC 7296:

| Notation | Payload |
|---|---|
| AUTH | Authentication |
| CERT | Certificate |
| CERTREQ | Certificate Request |
| CP | Configuration |
| D | Delete |
| EAP | Extensible Authentication |
| HDR | IKE header (not a payload) |
| IDi | Identification - Initiator |
| IDr | Identification - Responder |
| KE | Key Exchange |
| Ni, Nr | Nonce |
| N | Notify |
| SA | Security Association |
| SK | Encrypted and Authenticated |
| TSi | Traffic Selector - Initiator |
| TSr | Traffic Selector - Responder |
| V | Vendor ID |

The RFC 7296 notation and the present disclosure's enhancements to that notation are illustrated by several examples. Example 1 below is taken directly from RFC 7296. Notice that Example 1 uses "Initiator" and "Responder" terminology, which is RFC 7296 terminology that is replaced in later examples herein.

Example 1 shows a successful IKE_SA_INIT exchange followed by a successful IKE_AUTH exchange, performed with familiar technology. Example 1 is described in RFC 7296 notation as follows:

| Initiator | Responder |
|---|---|
| HDR, SAi1, KEi, Ni --> | |
| | <-- HDR, SAr1, KEr, Nr, [CERTREQ] |
| HDR, SK{IDi, [CERT,] [CERTREQ,] [IDr,] AUTH, SAi2, TSi, TSr} --> | |
| | <-- HDR, SK{IDr, [CERT,] AUTH, SAr2, TSi, TSr} |

Figure 3:
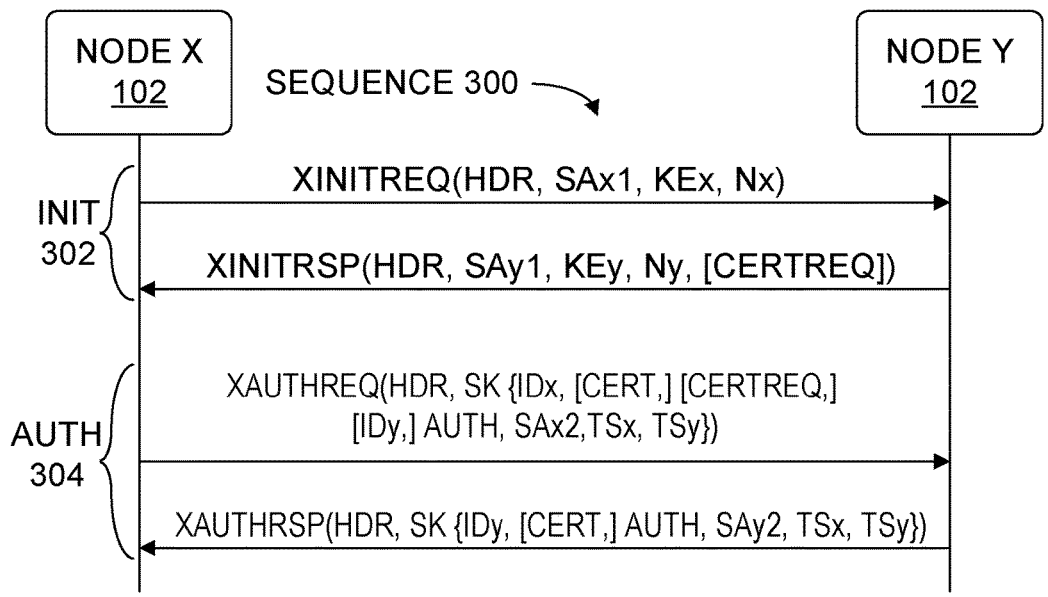
FIG. 3 is a node exchange diagram illustrating details of an Internet Key Exchange INIT phase and AUTH phase in which no collisions are threatened or occur.
Figure 4:
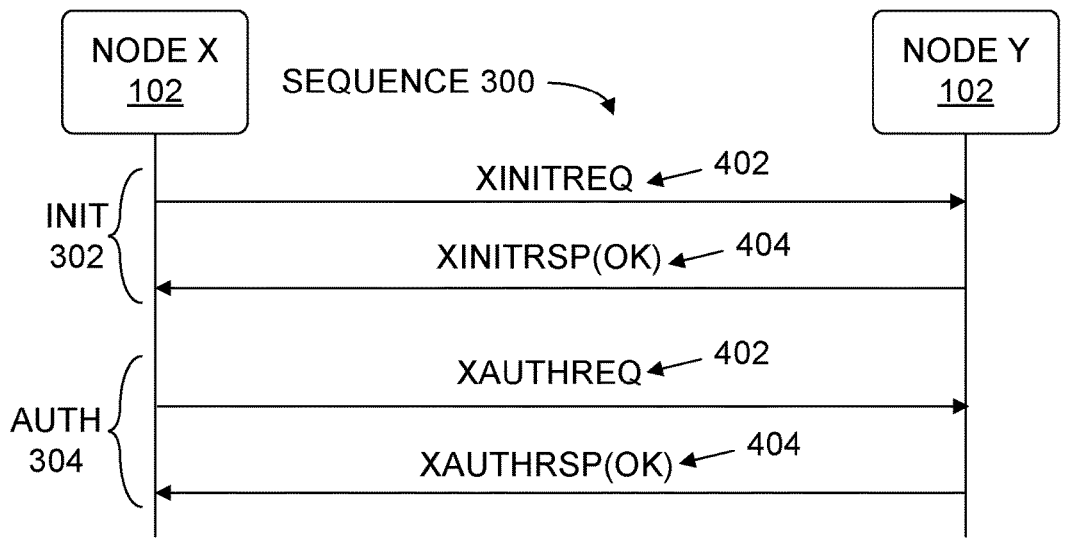
FIG. 4 is a node exchange diagram illustrating an overview of the exchanges shown in FIG. 3.

Example 2 is illustrated in FIGS. 3 and 4. The sequence of operations is the same as in Example 1, but FIGS. 3 and 4 use enhanced terminology and notation presented herein, as opposed to the different terminology and notation used in RFC 7296. For instance, the enhanced terminology refers to node X and node Y instead of Initiator and Responder, because the teachings herein allow both nodes to initiate a successful exchange. The enhanced terminology uses the following abbreviations:

REQ: request in a request/response pair
RSP: response in a request/response pair
XINIT: part of an IKE_SA_INIT exchange where X is the Initiator (thus Y is Responder)
YINIT: part of an IKE_SA_INIT exchange where Y is the Initiator (thus X is Responder)
XAUTH: part of an IKE_AUTH exchange where X is the Initiator (thus Y is Responder)
YAUTH: part of an IKE_AUTH exchange where Y is the Initiator (thus X is Responder)

Thus, XINITREQ is a request in an IKE_SA_INIT exchange initiated by X, XINITRSP is a response to such a request, YINITREQ is a request in an IKE_SA_INIT exchange initiated by Y, and YINITRSP is a response to such a request. Similarly, XAUTHREQ is a request in an IKE_AUTH exchange initiated by X, XAUTHRSP is a response to such a request, YAUTHREQ is a request in an IKE_AUTH exchange initiated by Y, and YAUTHRSP is a response to such a request.

FIG. 3 is captioned as a "detailed diagram", because it shows the HDR and IKE-specific payloads. FIG. 4 is an "overview diagram" that more clearly illustrates the order in which parts of an exchange happen. Overview diagrams can illustrate INIT exchanges, AUTH exchanges, and other exchanges, in a way that shows their shared sequences.

FIGS. 3 and 4 are presented in part to show the transition from a detailed diagram to an overview diagram. The same sequence 300 of operations occurs in each of FIG. 3 and FIG. 4, but the level of detail given for an individual operation differs.

FIG. 3 and FIG. 4 each also show operations during a IKE INIT phase 302 and other operations during an IKE AUTH phase 304.

FIGS. 3 and 4 are each captioned to indicate that the INIT and AUTH enhancements taught herein are not used. It may be that the INIT and AUTH enhancements are present but are not invoked (due to lack of any colliding attempts), or it may be that INIT and AUTH enhancements are not present. The sequence 300 may occur in either case. If the INIT and AUTH enhancements are not present, then the operations are being performed solely by a familiar implementation of IKE. If the INIT and AUTH enhancements are present, then the familiar implementation has been enhanced by software modifications to perform as taught, e.g., in one or more of Examples 5 through 8, but the enhancements are not executed in this sequence 300.

Figure 5:
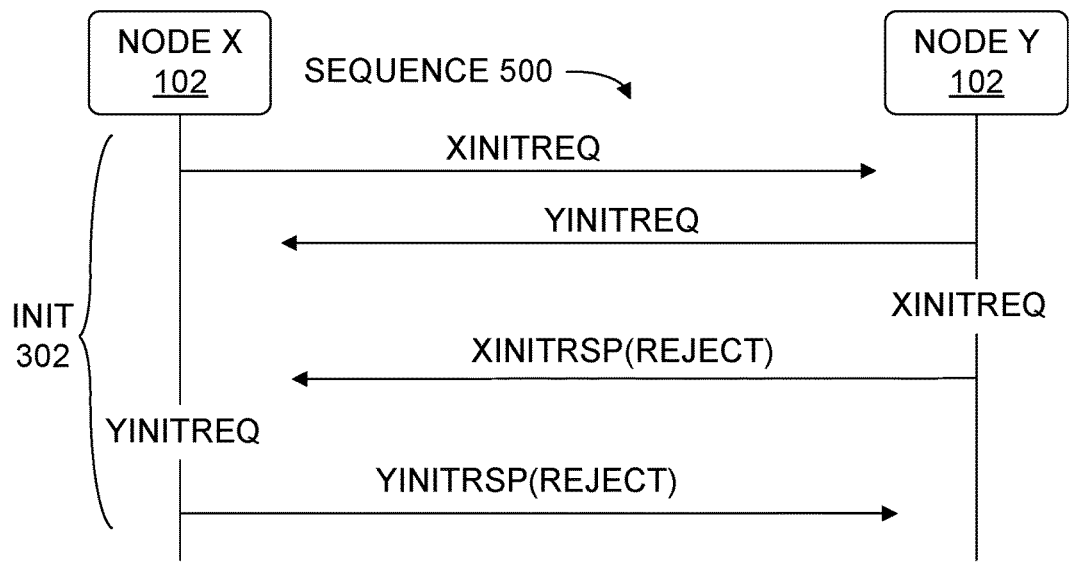
FIG. 5 is a node exchange diagram illustrating an overview of a sequence in which INIT attempts collide, causing failure of a security association establishment operation.

Example 3, illustrated in FIG. 5, includes colliding attempts. In sequence 500, two attempted IKE_SA_INIT exchanges collide and fail, due to a shortcoming of the familiar IKE_SA_INIT technology. This is described in the enhanced notation of Example 2, and uses placement of a request on the line coming down from a node to indicate when the node turns to a received request to process it. Requests are not necessarily processed right after their data is received, so other operations may occur first.

Figure 6:
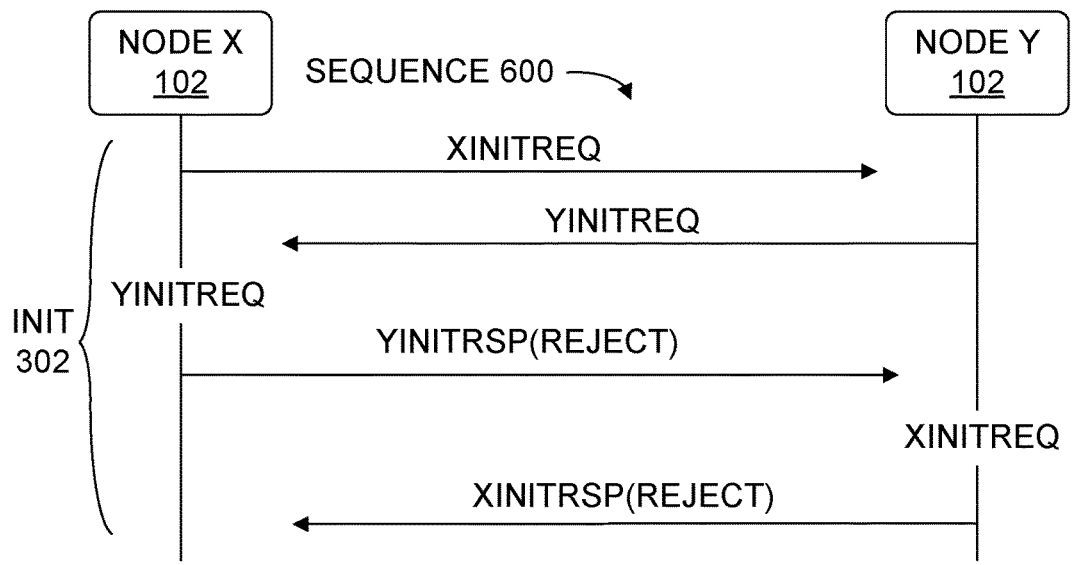
FIG. 6 is another node exchange diagram illustrating an overview of another sequence in which INIT attempts collide, causing failure of a security association establishment operation.
Figure 7:
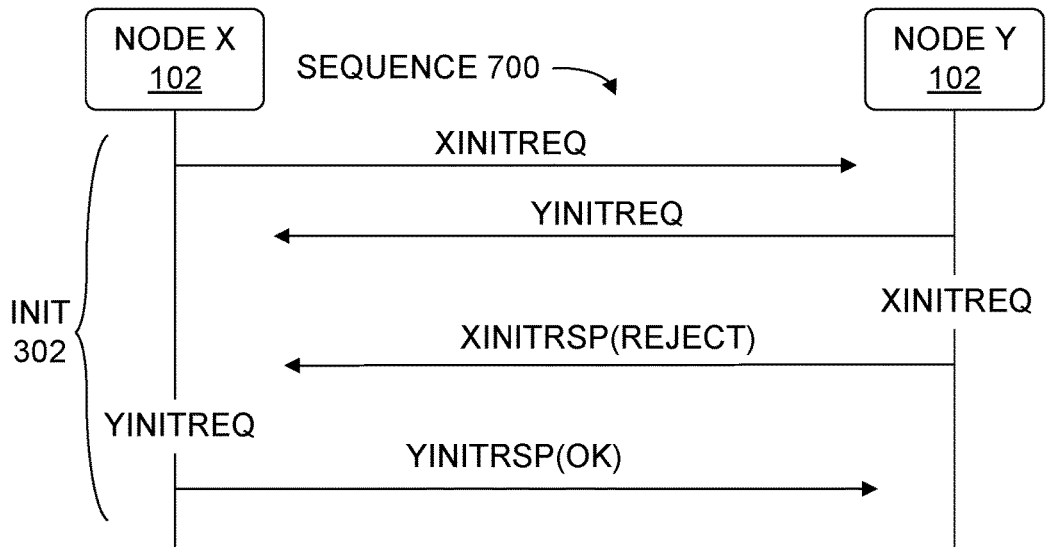
FIG. 7 is a node exchange diagram illustrating an overview of a sequence in which two INIT attempts collide, but one attempt succeeds by using an INIT collision prevention enhancement.
Figure 8:
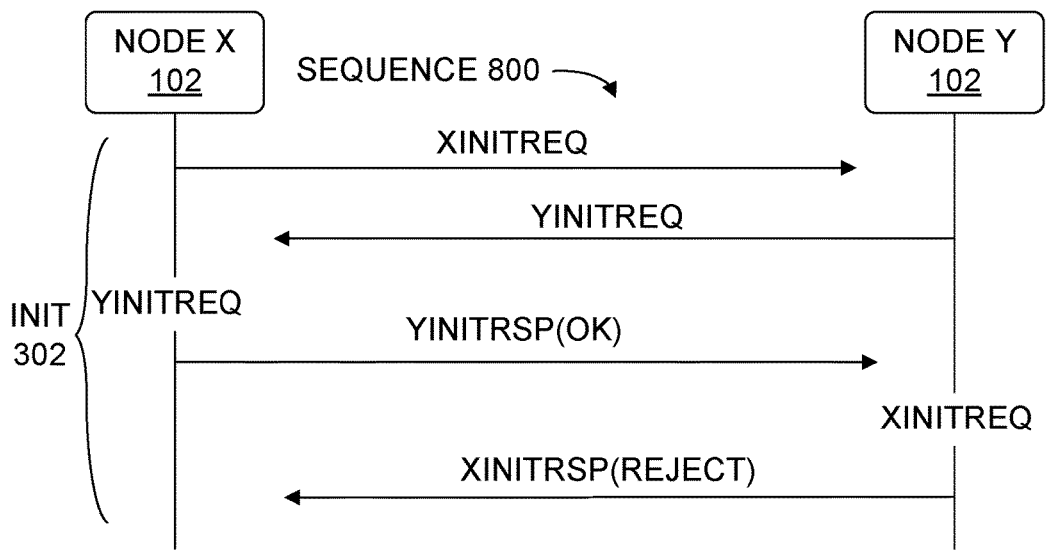
FIG. 8 is a node exchange diagram illustrating an overview of another sequence in which INIT attempts collide, and one attempt succeeds by using the INIT collision prevention enhancement.
Figure 9:
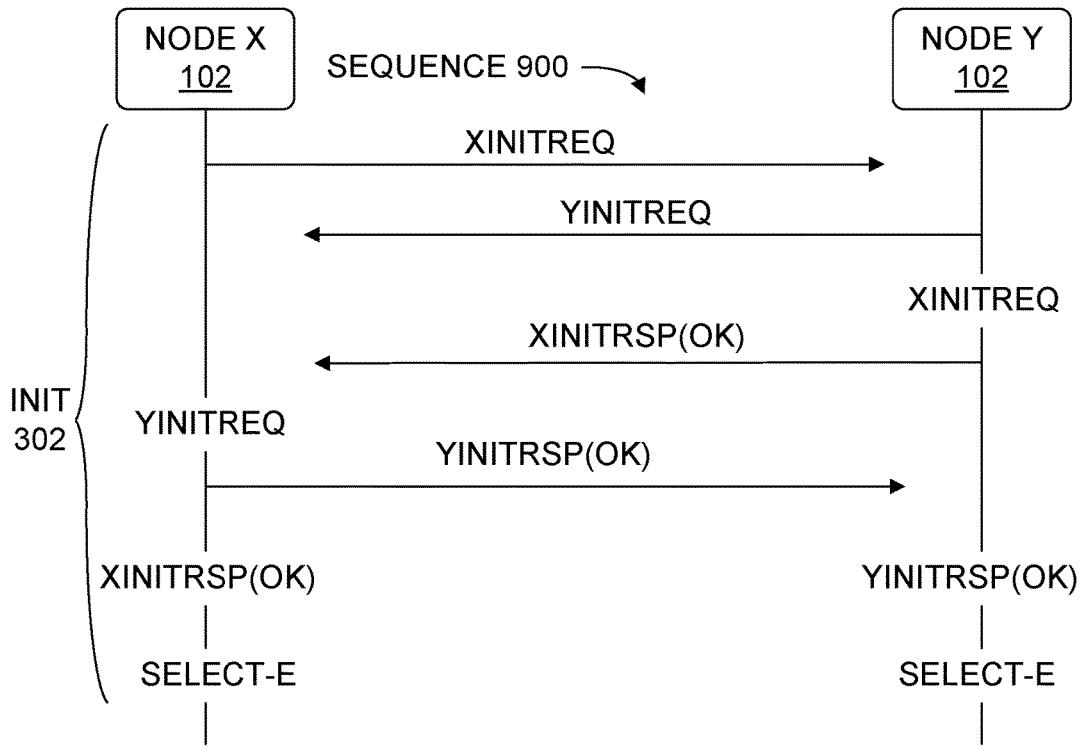
FIG. 9 is a node exchange diagram illustrating an overview of another sequence in which INIT attempts collide, and both attempts succeed by using the INIT collision prevention enhancement.
Figure 12:
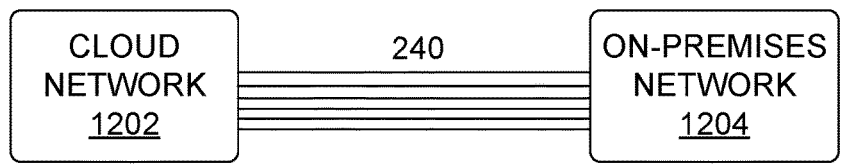
FIG. 12 is a diagram illustrating connections between a cloud network and an on-premises network.
Figure 10:
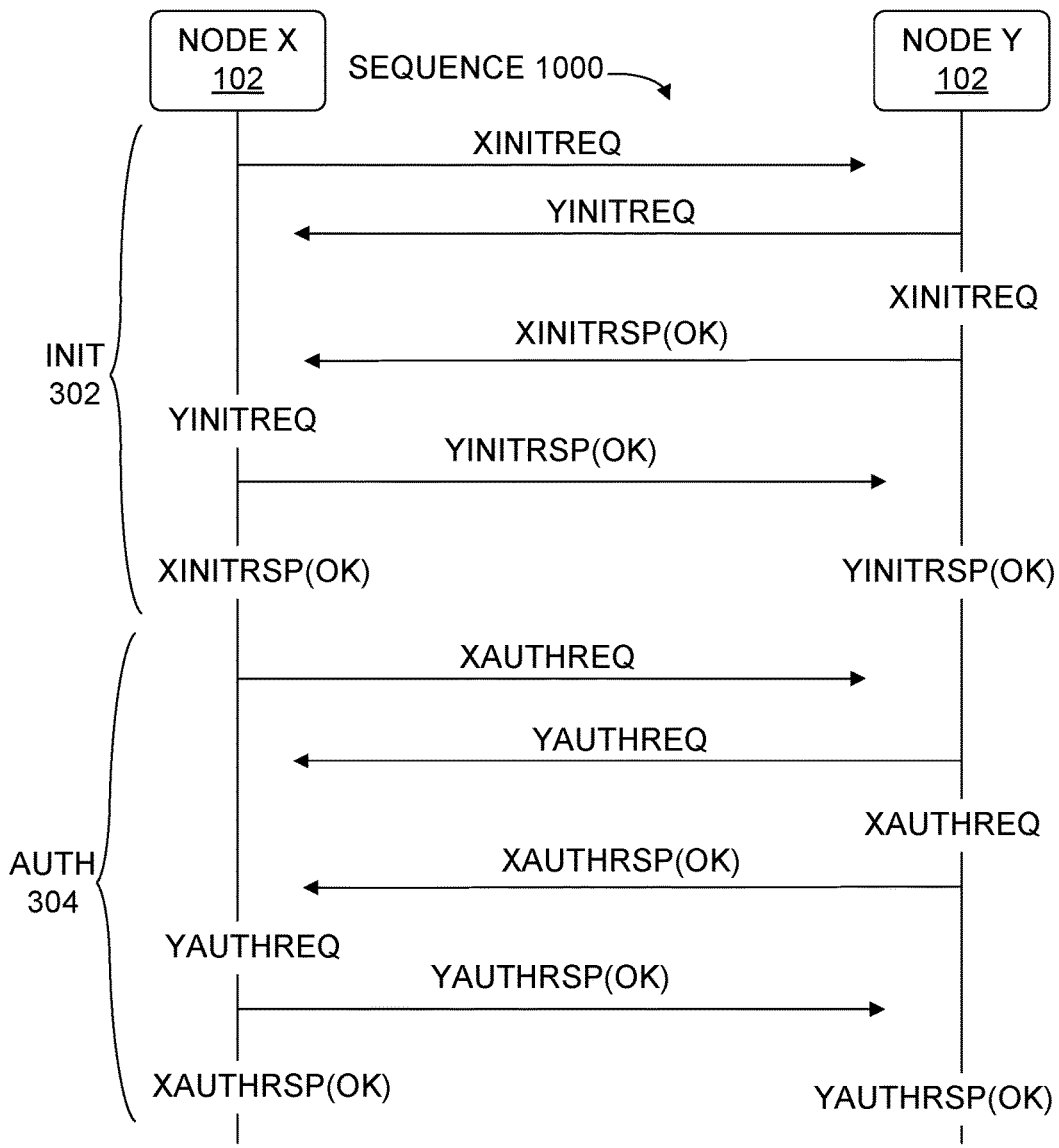
FIG. 10 is a node exchange diagram illustrating an overview of another sequence in which two INIT attempts collide, both INIT attempts succeed by using the INIT collision prevention enhancement, then two AUTH attempts collide, and both AUTH attempts succeed by using an AUTH collision prevention enhancement.

Moving from top to bottom, that is, as time advances, sequence 500 includes the following operations:
a) Node X sends XINITREQ toward node Y
b) Shortly after, node Y sends YINITREQ toward node X (this could have happened at the same time as the previous operation, but for clarity and compactness of the Figures, simultaneous operations are not depicted)
c) Node Y processes XINITREQ
d) Node Y sends a rejection of XINITREQ toward node X, because node Y is not enhanced and node Y's own YINITREQ is pending
e) Node X processes YINITREQ
f) Node X sends a rejection of YINITREQ toward node Y, because node X is not enhanced and node X's own XINITREQ is pending Example 4, illustrated in FIG. 6, shows a variation of Example 3, with sequence 600 being one of several possible different operation orders that produce the same outcome as sequence 500. In each sequence, two IKE_SA_INIT exchanges collide and fail due to a shortcoming of the familiar IKE_SA_INIT technology which does not overcome the IKE_SA_INIT collision, namely, the inability of a node to accept a request while the node's own request is pending.

Examples 5, 6, 7, and 8 (FIGS. 7, 8, 9 and 10) illustrate use of an INIT enhancement or an AUTH enhancement or both. The INIT enhancement allows a node to accept an INIT request initiated by another node even though the accepting node's own INIT request to that other node is still pending. Similarly, the AUTH enhancement allows a node to accept an AUTH request initiated by another node even though the accepting node's own AUTH request to that other node is still pending.

In Example 5 (FIG. 7), sequence 700 includes colliding INIT attempts. One attempt succeeds, because an INIT enhancement is used at node X to accept YINITREQ while XINITREQ is still pending. Node Y may or may not be enhanced; this sequence 700 is consistent with the behavior of both single-ended (node X enhanced but no enhancement at node Y) and double-ended (nodes X and Y both enhanced) solutions.

In Example 6 (FIG. 8), sequence 800 is a variation on sequence 700. Otherwise, the description of Example 5 (FIG. 7) sequence 700 applies.

In Example 7 (FIG. 9) and Example 8 (FIG. 10), two INIT attempts succeed. These Examples presume double-ended solutions in which nodes X and Y are both enhanced by code implemented an INIT enhancement.

In Example 7 (FIG. 9), the system chooses between the two INIT results, and only the chosen INIT result is used in the subsequent AUTH phase. Selection of the INIT result is shown in sequence 900 as SELECT-E. The selection may be accomplished, for instance, by each node choosing whichever INIT result corresponds to the more secure encryption, or choosing the least computationally expensive encryption, or choosing the INITREQ with the earliest timestamp, or the INITREQ from the highest-priority network (e.g., on-premises may be higher priority than cloud), or by other selection criteria 244.

In Example 8 (FIG. 10, sequence 1000), both INIT results are used, leading to two AUTH results. One AUTH result is then used for incoming traffic and the other is used for outgoing traffic. For instance, at node X the XINIT leads to the XAUTH and the XAUTH is used by node X for outgoing traffic while the YAUTH is used by node X for incoming traffic. Similarly, at node Y the YINIT leads to the YAUTH and the YAUTH is used by node Y for outgoing traffic while the XAUTH is used by node Y for incoming traffic One of skill will recognize that many other sequences are possible, consistent with the teachings herein. It is neither necessary nor efficient to illustrate every sequence in the Figures.

One of skill will also recognize that in addition to using the graphic elements in the Figures, sequences may be illustrated in other ways. Different graphics could be used, or purely prose descriptions could be used. Alternately, depictions could use few or no graphics as such, yet not be prose sentences. For instance, the following Example 9 depicts a sequence in which INIT messages are accepted from both sides of a connection when INIT collision enhancement is in place, but attempts are rejected in the AUTH phase. If some implementations choose to implement this way, it will protect in such cases as well.

Example 9

```
XINITREQ -->
    <-- YINITREQ
YINITRSP(OK) -->
    <-- XINITRSP(OK)
XAUTHREQ -->
    <-- YAUTHREQ
YAUTHREQ(rejected by X because XAUTHREQ pending) -->
    <-- XAUTHREQ(rejected by Y because YAUTHREQ pending)
```

The following Example 10 depicts a sequence in which INIT messages are accepted from both sides of a connection when INIT collision enhancement is in place on both nodes, but one attempt is rejected in the AUTH phase because only one node has the AUTH enhancement code.

Example 10

```
XINITREQ -->
    <-- YINITREQ
YINITRSP(OK) -->
    <-- XINITRSP(OK)
XAUTHREQ -->
    <-- YAUTHREQ
YAUTHREQ
(OK - accepted by X even thought XAUTHREQ pending)-->
    <-- XAUTHREQ(rejected by Y because YAUTHREQ pending)
```

Technical Character

The technical character of embodiments described herein will be apparent to one of ordinary skill in the art, and will also be apparent in several ways to a wide range of attentive readers. First, some embodiments address technical activities that are rooted in computing technology, such as detecting collisions in attempts to establish a connection over a network, and negotiating security parameters for a network connection. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein accept a secure connection request from another network node even though their own secure connection request to that other node has not been answered. Third, technical effects provided by some embodiments include reduction or avoidance of network secure connection retry efforts. Fourth, some embodiments include technical adaptations such as code using criteria for selecting between two successful INIT results, and a system which divides traffic so that incoming traffic uses one security association while outgoing traffic uses another security association. Other advantages and characteristics will also be apparent to one of skill from the description provided.

Acronyms and Abbreviations

Some acronyms and abbreviations are defined below. Others are defined elsewhere herein or require no definition to be understood by one of skill.
ALU: arithmetic and logic unit
API: application program interface
APP: application
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
IKE: Internet Key Exchange (v1 or v2)
IKEv1: Internet Key Exchange version 1
IKEv2: Internet Key Exchange version 2
IP: internet protocol
IPSec: Internet Protocol Security (a.k.a. IPsec)
KINK: Kerberized Internet Negotiation of Keys
LAN: Local Area Network
NVRAM: non-volatile random access memory
OS: operating system
RAM: random access memory
ROM: read only memory
SA: security association
SQL: structured query language
TCP: Transmission Control Protocol
UDP: User Datagram Protocol
URL: uniform resource locator
VPN: virtual private network
WAN: Wide Area Network
Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a program in a cloud computing environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as reading and writing packet payloads, and performing calculations to implement a key exchange protocol, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as communicating, employing, establishing, exchanging, processing, rebooting, receiving, selecting, sending, using, waiting (and communicated, communicates, employed, employs, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment or network environment
102 node, e.g., computer system, also referred to as network node, endpoint, peer, computational system or computing system; note that both individual nodes and a collection of nodes is referred to using numeral 102, since a cluster may be a node and a system may have one or more constituent machines, but unless otherwise indicated "node" refers to an individual machine while "system" refers to multiple machines
104 users
106 peripherals
108 network
110 processor
112 computer-readable storage medium, e.g., RAM, hard disks
114 removable configured computer-readable storage medium
116 instructions executable with processor; may be on removable media or in other memory (volatile or non-volatile or both)
118 data
120 kernel(s), e.g., operating system(s), BIOS, device drivers
122 networking software
124 software other than kernel and networking software, e.g., middleware, and applications such as word processors, web browsers, spreadsheets
126 computing hardware not otherwise associated with a reference number 106, 108, 110, 112, 114
200 software, packets, and other items involved in networking
202 Internet Key Exchange software (v1 or v2 or both unless otherwise indicated; context indicates whether enhancement at taught herein is present or only familiar code is present), a.k.a. IKE software
204 software which performs IKE INIT phase operations
206 software which performs IKE AUTH phase operations
208 IKE header in IKE INIT or IKE AUTH phase operations
210 IKE packet in IKE INIT or IKE AUTH phase operations
212 ISAKMP implementation software
214 security association, e.g., per IKE and related RFCs
216 network packets generally, including not only those exchanged during creation of security association but also other packets
218 IPSec implementation code which is not specific to IKE
220 networking code which is not specific to IPSec
222 network stack link layer code
224 network stack transport layer code
226 network stack internet layer code
228 internet layer
230 results of connection request
232 acceptance of connection request, e.g., acceptance of secure connection INIT request or secure connection AUTH request
234 rejection of connection request, e.g., rejection of secure connection INIT request or secure connection AUTH request
236 traffic (packets) incoming to a node
238 traffic (packets) outgoing from a node
240 connection, e.g., any network construct which sends or receives data between nodes
242 timeout
244 INIT result selection criteria
300 sequence of operations including successful INIT and successful AUTH with no colliding attempts
302 INIT phase of IKE operations
304 AUTH phase of IKE operations
402 connection request
404 connection response
500 sequence of operations including colliding INIT attempts and failure to form desired connection
600 another sequence of operations including colliding INIT attempts and failure to form desired connection
700 sequence of operations including colliding INIT attempts with one attempt succeeding by virtue of INIT enhancement
800 another sequence of operations including colliding INIT attempts with one attempt succeeding by virtue of INIT enhancement
900 sequence of operations including colliding INIT attempts with both attempts succeeding by virtue of INIT enhancements
1000 sequence of operations including colliding INIT attempts with both attempts succeeding by virtue of INIT enhancements, followed by colliding AUTH attempts with both attempts succeeding by virtue of AUTH enhancements
1100 flowchart
1102 send connection request
1104 receive connection request
1106 process connection request
1108 send acceptance of connection request
1110 receive acceptance of connection request
1112 establish or re-establish security association or secured connection
1114 operate in INIT phase, e.g., send or receive during INIT phase
1116 operate in AUTH phase, e.g., send or receive during AUTH phase
1122 select a result of INIT phase operations
1124 use a result of INIT phase operations, e.g., in subsequent AUTH phase operations
1126 employ a security association, e.g., in a VPN
1128 provide functionality enhancement, e.g., by executing code which implements INIT functionality enhancement or AUTH functionality enhancement
1130 functionality enhancement, e.g., by INIT functionality enhancement or AUTH functionality enhancement or other enhancement which removes familiar inability to accept a request from another node while a request to that node is pending
1132 wait for timeout period to elapse
1134 communicate over a connection, e.g., by steps 1102, 1104, 1108, 1110, 1144, 1150, 1152, 1154, or 1156
1136 avoid retry operation by accepting a request from another node while a request to that node is pending
1138 retry operation
1140 perform maintenance, e.g., by updating network stack to fix bugs or add support for a different protocol
1142 restart or reboot node network software, thereby presuming or causing termination of connections to node
1144 perform key exchange
1146 IKE key exchange protocol
1148 KINK key exchange protocol
1150 send response to connection request
1152 receive response to connection request
1154 send rejection of connection request
1156 receive rejection of connection request
1158 pend, i.e., await timeout or a response to a request
1160 reach timeout max, namely, timeout period elapsed
1202 cloud network
1204 on-premises (i.e., non-cloud) network Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine may be considered a computer system, since it has a processor and memory and component parts, but "system" generally refers herein to a group of cooperating machines. A given computer system or node 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated. A GUI may include integrated NUI or voice command functionality, for example. A GUI may be generated on a local desktop computer, or on a smart phone, for example, or it may be generated from a web server and sent to a client device 102.

Natural user interface (NUI) operation may use peripherals 106 or other hardware 126 for speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 126 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), and memory/storage media 112, an operating environment may also include other hardware 126, such as displays, batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

FIG. 1 is provided for convenience. Inclusion of an item in FIG. 1 does not imply that the item, or the described use of the item, was known prior to the current innovations.

Network Connection Items

Figure 2:
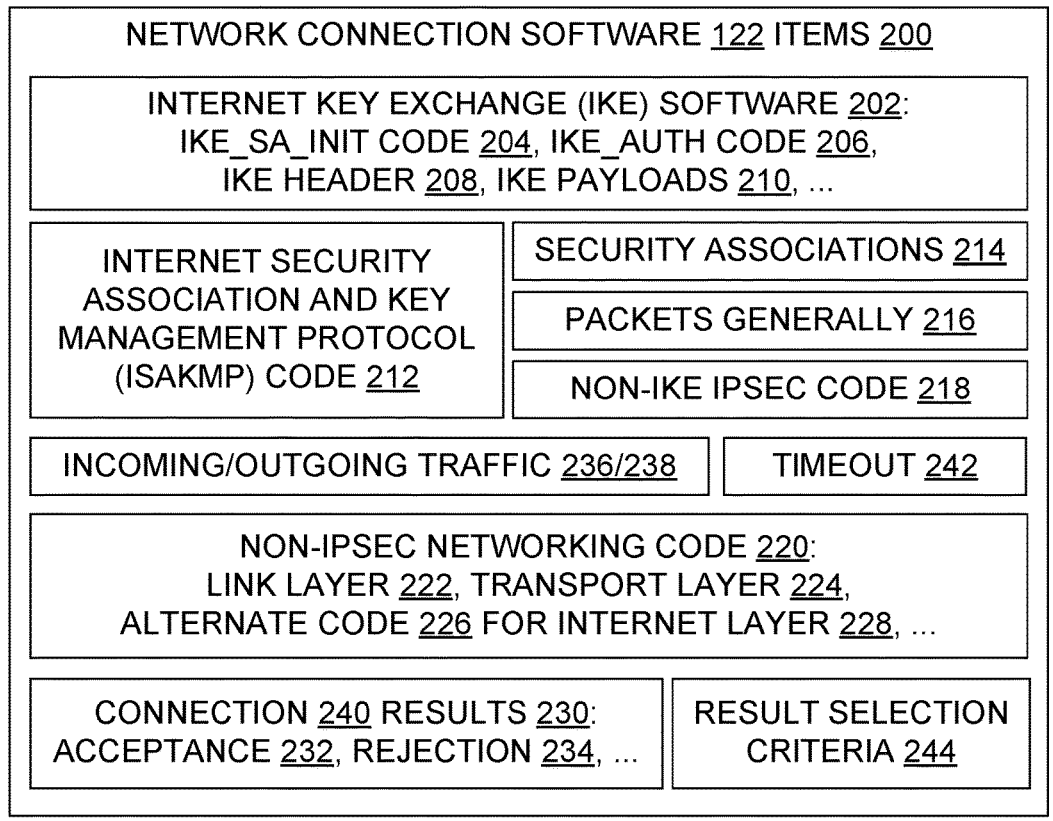
FIG. 2 is a block diagram illustrating aspects of network software in a computing environment such as a network environment containing one or more computing systems as nodes.

FIG. 2 illustrates aspects of networking in some embodiments. Network connection software 122 may include IKE software 202 (which may be enhanced as taught herein), ISAKMP software 212, IPSec software 218 in addition to the IKE software, and other networking software 220 in addition to the IPSec and ISAKMP software. The networking software is generally organized in a stack that includes code 226 for an internet layer 228, code for a link layer 222, and code for a transport layer 224. IPSec code is internet layer code, but a given node 102 may have alternate non-IPSec code 226, e.g., for Internet Protocol (v4 or v6 or both) or for Internet Control Message Protocol, in addition to IPSec code.

Packets 216 are transmitted over the network by the software of a given node 102 as outgoing traffic 238 and received at the node as incoming traffic 236. Traffic is transmitted over one or more connections 240. Connections may be secured using IPSec software and security associations 214 created with the IKE software. IKE protocol proceeds in phases, and hence IKE software includes code 204 for an INIT phase, and code 206 for an AUTH phase. IKE software utilizes familiar IKE headers 208 and IKE payloads 210 in packets, as discussed for example in RFC 7296.

Key exchanges and other operations which attempt to create connections have computational results 230, such as acceptances 232, rejections 234, and responses to status inquiries. Connection creation may be subject to one or more timeouts 242.

Systems

Some embodiments use or provide a computing system 102 equipped with secure connection request collision prevention technology (enhanced IKE software 202) for preventing collisions by increasing acceptance of secure connection requests during pendency of other network secure connection requests.

In some embodiments, the computing system includes at least two network nodes, designated here as node X and node Y, each said node respectively including at least one processor 110, a memory 112 in operable communication with the processor, and secure connection software 122 residing at least partially in the memory and at least partially executable with the processor. A secure connection request sent by one of the nodes is considered to be "pending" when (a) no response to the secure connection request has been received and processed by the node which sent the secure connection request, and (b) a maximum predetermined time that the node will wait for such a response has not elapsed.

In some embodiments, the secure connection software of at least one of the network nodes provides a functionality enhancement 1130 of a security protocol implementation. The enhancement allows the network node to accept a secure connection request 402 initiated by another node even though the accepting node's own secure connection request 402 to that other node is still pending (no response 404 yet).

In some embodiments, the enhancement 1130 is provided on node X, and the enhancement is not provided on node Y. In some, the enhancement 1130 is provided both on node X and on node Y. More generally, different enhancements 1130 may be present, such as INIT enhancements or AUTH enhancements, in various combinations, with the understanding that at least one enhancement is present on at least one node 102.

In some embodiments, the enhancement 1130 provides at least one of the following: (a) collision prevention technology which accepts an incoming Internet Key Exchange INIT phase secure connection request 402 from another node at an accepting node 102 during pendency of the accepting node's own outgoing Internet Key Exchange INIT phase secure connection request 402 to the other node 102; (b) collision prevention technology which accepts an incoming Internet Key Exchange AUTH phase secure connection request 402 from another node 102 at an accepting node 102 during pendency of the accepting node's own outgoing Internet Key Exchange AUTH phase secure connection request 402 to the other node.

In some embodiments, node X is part of a cloud network 1202 and node Y is part of an on-premises network 1204. In other embodiments, both nodes 102 are in the same network 108, e.g., they are both in the same cloud, or they are both in the same non-cloud network. Different clouds may be provided by different vendors. A given vendor may also provide different clouds 1202 to different customers, e.g., one cloud for governmental use and another cloud for non-governmental use.

In some embodiments, the enhanced secure connection software 122 of node X upon execution performs at least the following: (a) node X selects an INIT phase secure connection result 230 from among at least two INIT phase secure connection results, one of the INIT phase secure connection results based at least partially on information in a Y-to-X secure connection request, another of the INIT phase secure connection results based at least partially on information in an X-to-Y secure connection request; and then (b) node X uses the selected INIT phase secure connection result in a subsequent AUTH phase secure connection exchange (e.g., request 402 plus response 404) with node Y.

In some embodiments, the enhanced secure connection software 122 of node X upon execution performs at least as follows: node X employs a first security association 214 for outgoing traffic 238 to network node Y, and node X employs a second security association 214 for incoming traffic 236 from network node Y. This may be accomplished by providing separate authentication code, buffers, and workflows for the two directions of traffic.

Methods

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

FIGS. 7-11 discussed above illustrate methods in the context of INIT phase enhancements, AUTH phase enhancements, or both.

Figure 11:
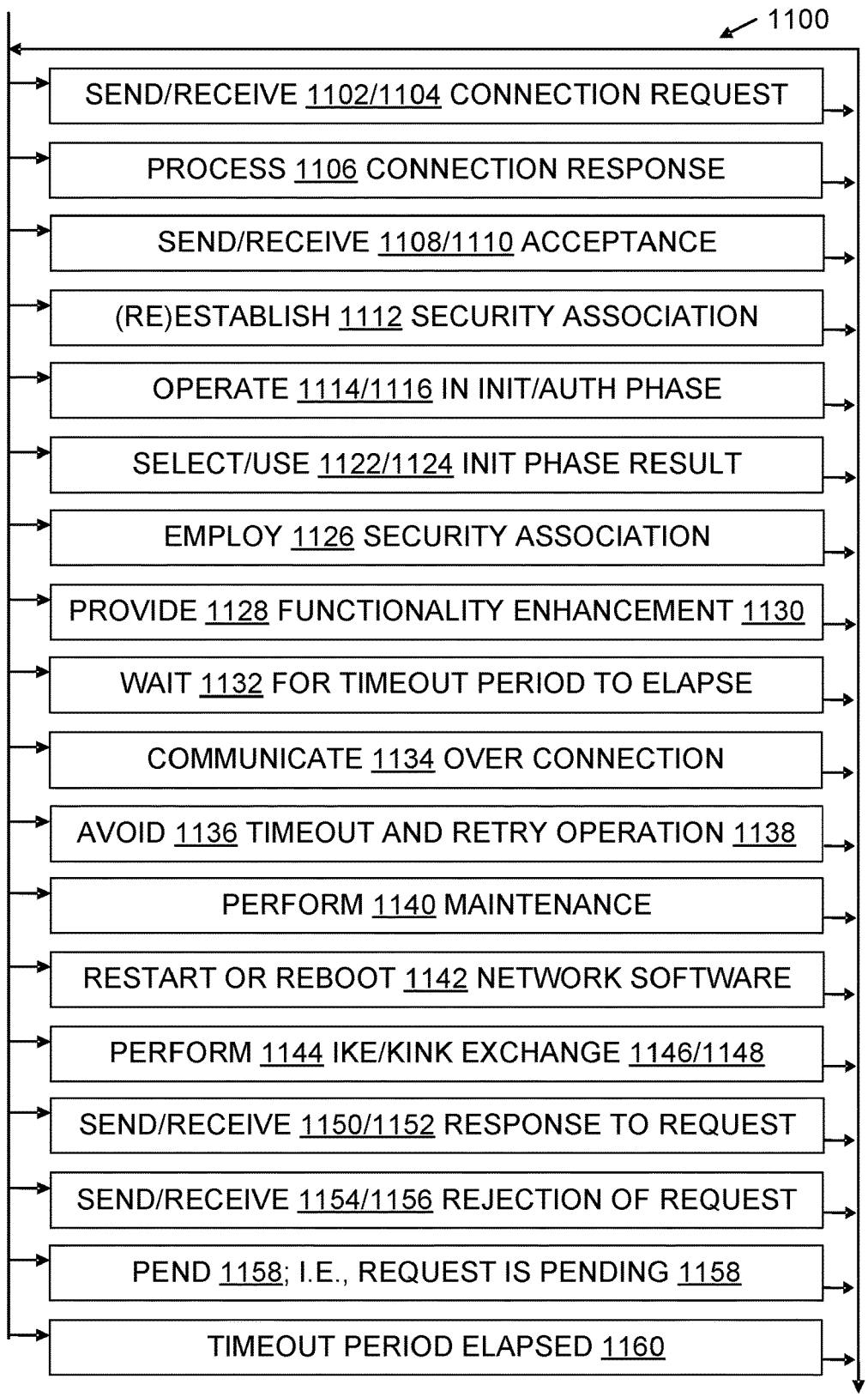
FIG. 11 is flow chart further illustrating aspects of some process and configured storage medium technologies for preventing collision of connection requests by accepting incoming requests despite the pendency of outgoing requests, and by handling multiple connection results.

FIG. 11 illustrates some method embodiments in a general flowchart 1100. Technical methods shown in the Figures or otherwise disclosed will be performed automatically, e.g., by enhanced network connection software 122, unless otherwise indicated. Methods may also be performed in part automatically and in part manually to the extent action by a human administrator or other human person is implicated, e.g., a person may command that a reboot be performed. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 11. Steps may be performed serially, in a partially overlapping manner, or fully in parallel. The order in which flowchart 1100 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a method for reducing failed secure connections in a network, by preventing collisions by increasing acceptance of secure connection requests during pendency of other network secure connection requests. One method includes a network node X sending 1102 an X-to-Y secure connection request toward a network node Y, and network node X receiving 1104 a Y-to-X secure connection request from network node Y while the X-to-Y secure connection request sent by network node X is pending 1158. The X-to-Y secure connection request is considered pending after network node X has sent the X-to-Y secure connection request and before network node X has received 1152 from network node Y and processed 1106 a response to the X-to-Y secure connection request and while a maximum predetermined time 242 that network node X will wait for that response has not elapsed 1160. The method also includes network node X sending 1108 toward network node Y an acceptance of the Y-to-X secure connection request, instead of network node X rejecting 1154 the Y-to-X secure connection request because the X-to-Y secure connection request is still pending 1158.

In some embodiments, network node X communicates 1134 with network node Y to establish 1112 a security association 214 between network node X and network node Y. The security association is based at least partially on information in the Y-to-X secure connection request.

In some of these embodiments, the X-to-Y secure connection request is part of a first INIT phase 302, namely, an INIT phase in which network node X operates 1114 as Initiator and network node Y operates 1114 as Responder under a node X Internet Key Exchange protocol implementation, and the Y-to-X secure connection request is part of a second INIT phase 302, namely, an INIT phase in which network node Y operates 1114 as Initiator and network node X operates 1114 as Responder under a node Y Internet Key Exchange protocol implementation.

In some of these embodiments, the X-to-Y secure connection request is part of a first AUTH phase 304, namely, an AUTH phase in which network node X operates 1116 as Initiator and network node Y operates 1116 as Responder under a node X Internet Key Exchange protocol implementation, and the Y-to-X secure connection request is part of a second AUTH phase 304, namely, an AUTH phase in which network node Y operates 1116 as Initiator and network node X operates 1116 as Responder under a node Y Internet Key Exchange protocol implementation.

Some embodiments further include network node X receiving 1110 from network node Y an acceptance of the X-to-Y secure connection request. In some of these the method further comprising network node X communicating 1134 with network node Y to establish 1112 a security association between network node X and network node Y, with the security association based at least partially on information in the X-to-Y secure connection request.

In some embodiments, network node X selects 1122 an INIT phase secure connection result 230 from among at least two INIT phase secure connection results. One of the INIT phase secure connection results is based at least partially on information in the Y-to-X secure connection request, while another of the INIT phase secure connection results is based at least partially on information in the X-to-Y secure connection request. Then network node X uses 1124 the selected INIT phase secure connection result in a subsequent AUTH phase secure connection exchange with network node Y.

In some embodiments, network node X employs 1126 a first security association for outgoing traffic to network node Y, and network node X employs 1126 a second security association for incoming traffic from network node Y.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as network connection software 122, connection results 230, and other items discussed herein, in the form of data 118 and instructions 116, read from a removable medium 114 and/or another source such as a network connection, to form a configured medium. The configured medium 112 is capable of causing a computer system to perform technical process steps for reducing or avoiding 1136 connection retry efforts as disclosed herein. The Figures thus help illustrate configured storage media embodiments and process embodiments, as well as system and process embodiments. In particular, any of the process steps illustrated in FIGS. 7-11 or otherwise taught herein may be used to help configure a storage medium to form a configured medium embodiment.

Some examples use or provide a computer-readable storage medium 112 configured with data 118 and instructions 116 which upon execution with a processor 110 perform a method for preventing collisions by increasing acceptance of connection requests during pendency of other network connection requests. This method includes a network node X sending 1102 an X-to-Y connection request toward a network node Y, and network node X receiving 1104 a Y-to-X connection request from network node Y while the X-to-Y connection request sent by network node X is pending. In this context, "pending" means after network node X has sent the X-to-Y connection request and before network node X has received 1152 from network node Y and processed 1106 a response to the X-to-Y connection request and before a maximum predetermined time 242 that network node X will wait for that response has elapsed 1160. This method also includes network node X sending 1108 toward network node Y an acceptance of the Y-to-X connection request, instead of network node X rejecting 1154 the Y-to-X connection request because the X-to-Y connection request is still pending.

This method also includes network node X communicating 1134 with network node Y over a connection which has been established based at least in part on the Y-to-X connection request. This communicating 1134 includes network node X transmitting application or end-user data to network node Y or network node X receiving application or end-user data from network node Y, or network node X both transmitting and receiving such data. The communicating occurs without network node X and network node Y first undergoing a timeout and retry operation 1138 which would have occurred if network node X had not sent network node Y an acceptance of the Y-to-X connection request.

In some embodiments, network node X is part of a cloud network and the connection requests occur after performing 1140 cloud software maintenance operations and after restarting or rebooting 1142 networking software in the cloud network.

In some embodiments, the connection requests 402 occur 1102, 1104 within at least one of the following: one or more Internet Key Exchange v1 exchanges, more Internet Key Exchange v2 exchanges, one or more Kerberized Internet Negotiation of Keys exchanges.

In some embodiments, the X-to-Y connection request is part of a first INIT phase 302, namely, an INIT phase in which network node X operates as Initiator and network node Y operates as Responder under a node X Internet Key Exchange v2 protocol implementation, and the Y-to-X connection request is part of a second INIT phase 302, namely, an INIT phase in which network node Y operates as Initiator and network node X operates as Responder under a node Y Internet Key Exchange v2 protocol implementation.

In some embodiments, the X-to-Y connection request is part of a first AUTH phase 304, namely, an AUTH phase in which network node X operates as Initiator and network node Y operates as Responder under a node X Internet Key Exchange v2 protocol implementation, and the Y-to-X connection request is part of a second AUTH phase 304, namely, an AUTH phase in which network node Y operates as Initiator and network node X operates as Responder under a node Y Internet Key Exchange v2 protocol implementation.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 7-11 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

All familiar protocols (e.g., IKE, KINK, UDP, TCP, IPSec) and their respective industry standards referenced herein are understood as referencing the familiar protocols and their respective industry standards as they exist at the time of filing of the present disclosure.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method for reducing failed secure connections in a network, by preventing collisions by increasing acceptance of secure connection requests during pendency of other network secure connection requests, the method comprising:
   a network node X sending an X-to-Y secure connection request toward a network node Y;
   network node X receiving a Y-to-X secure connection request from network node Y while the X-to-Y secure connection request sent by network node X is pending, namely, after network node X has sent the X-to-Y secure connection request and before network node X has received from network node Y and processed a response to the X-to-Y secure connection request and a maximum predetermined time that network node X will wait for that response has not elapsed;
   network node X sending toward network node Y an acceptance of the Y-to-X secure connection request, instead of network node X rejecting the Y-to-X secure connection request because the X-to-Y secure connection request is still pending;
   network node X communicating with network node Y to establish a security association between network node X and network node Y, the security association based at least partially on information in the Y-to-X secure connection request, wherein the method is further characterized in at least one of the following ways:
      the X-to-Y secure connection request is part of a first INIT phase, namely, an INIT phase in which network node X operates as Initiator and network node Y operates as Responder under a node X Internet Key Exchange protocol implementation, and wherein the Y-to-X secure connection request is part of a second INIT phase, namely, an INIT phase in which network node Y operates as Initiator and network node X operates as Responder under a node Y Internet Key Exchange protocol implementation; or
      the X-to-Y secure connection request is part of a first AUTH phase, namely, an AUTH phase in which network node X operates as Initiator and network node Y operates as Responder under a node X Internet Key Exchange protocol implementation, and wherein the Y-to-X secure connection request is part of a second AUTH phase, namely, an AUTH phase in which network node Y operates as Initiator and network node X operates as Responder under a node Y Internet Key Exchange protocol implementation.

2. The method of claim 1, further comprising network node X receiving from network node Y an acceptance of the X-to-Y secure connection request.

3. The method of claim 2, further comprising network node X communicating with network node Y to establish a security association between network node X and network node Y, the security association based at least partially on information in the X-to-Y secure connection request.

4. The method of claim 1, further comprising:
   network node X selecting an INIT phase secure connection result from among at least two INIT phase secure connection results, one of the INIT phase secure connection results based at least partially on information in the Y-to-X secure connection request, another of the INIT phase secure connection results based at least partially on information in the X-to-Y secure connection request; and then
   network node X using the selected INIT phase secure connection result in a subsequent AUTH phase secure connection exchange with network node Y.

5. The method of claim 1, further comprising:
   network node X employing a first security association for outgoing traffic to network node Y; and
   network node X employing a second security association for incoming traffic from network node Y.

6. A computing system equipped with secure connection request collision prevention technology for preventing collisions by increasing acceptance of secure connection requests during pendency of other network secure connection requests, the computing system comprising:
   at least two network nodes, designated here as node X and node Y, each said node respectively comprising:
      at least one processor;
      a memory in operable communication with the processor; and
      secure connection software residing at least partially in the memory and at least partially executable with the processor;
   wherein a secure connection request sent by one of the nodes is considered to be pending when (a) no response to the secure connection request has been received and processed by the node which sent the secure connection request, and (b) a maximum predetermined time that the node will wait for such a response has not elapsed;
   wherein the secure connection software of at least one of the network nodes provides a functionality enhancement of a security protocol implementation, the enhancement allowing the network node to accept a secure connection request initiated by another node even though the accepting node's own secure connection request to that other node is still pending; and
   wherein the enhancement provides at least one of the following:
      collision prevention technology which accepts an incoming Internet Key Exchange INIT phase secure connection request from another node at an accepting node during pendency of the accepting node's own outgoing Internet Key Exchange INIT phase secure connection request to the other node;
      collision prevention technology which accepts an incoming Internet Key Exchange AUTH phase secure connection request from another node at an accepting node during pendency of the accepting node's own outgoing Internet Key Exchange AUTH phase secure connection request to the other node.

7. The computing system of claim 6, wherein the enhancement is provided on node X, and the enhancement is not provided on node Y.

8. The computing system of claim 6, wherein the enhancement is provided both on node X and on node Y.

9. The computing system of claim 6, wherein node X is part of a cloud network and node Y is part of an on-premises network.

10. The computing system of claim 6, wherein the secure connection software of node X upon execution performs at least the following:

node X selects an INIT phase secure connection result from among at least two INIT phase secure connection results, one of the INIT phase secure connection results based at least partially on information in a Y-to-X secure connection request, another of the INIT phase secure connection results based at least partially on information in an X-to-Y secure connection request; and then node X uses the selected INIT phase secure connection result in a subsequent AUTH phase secure connection exchange with node Y.

11. A computer-readable storage medium configured with instructions which upon execution by one or more processors perform a method for preventing collisions by increasing acceptance of connection requests during pendency of other network connection requests, the method comprising:

a network node X sending an X-to-Y connection request toward a network node Y;

network node X receiving a Y-to-X connection request from network node Y while the X-to-Y connection request sent by network node X is pending, namely, after network node X has sent the X-to-Y connection request and before network node X has received from network node Y and processed a response to the X-to-Y connection request and a maximum predetermined time that network node X will wait for that response has not elapsed;

network node X sending toward network node Y an acceptance of the Y-to-X connection request, instead of network node X rejecting the Y-to-X connection request because the X-to-Y connection request is still pending; and network node X communicating with network node Y over a connection which has been established based at least in part on the Y-to-X connection request, said communicating including network node X transmitting application or end-user data to network node Y or network node X receiving application or end-user data from network node Y, or network node X both transmitting and receiving such data;

wherein said communicating occurs without network node X and network node Y first undergoing a timeout and retry operation which would have occurred if network node X had not sent network node Y an acceptance of the Y-to-X connection request; and wherein the method is further characterized in at least one of the following ways:

the X-to-Y secure connection request is part of a first INIT phase, namely, an INIT phase in which network node X operates as Initiator and network node Y operates as Responder under a node X Internet Key Exchange protocol implementation, and wherein the Y-to-X secure connection request is part of a second INIT phase, namely, an INIT phase in which network node Y operates as Initiator and network node X operates as Responder under a node Y Internet Key Exchange protocol implementation; or the X-to-Y secure connection request is part of a first AUTH phase, namely, an AUTH phase in which network node X operates as Initiator and network node Y operates as Responder under a node X Internet Key Exchange protocol implementation, and wherein the Y-to-X secure connection request is part of a second AUTH phase, namely, an AUTH phase in which network node Y operates as Initiator and network node X operates as Responder under a node Y Internet Key Exchange protocol implementation.

12. The configured computer-readable storage medium of claim 11, wherein network node X is part of a cloud network and the connection requests occur after cloud software maintenance operations and restarting or rebooting networking software in the cloud network.

13. The method of claim 1, wherein at least one of network node X and network node Y is part of a cloud network.

14. The method of claim 1, wherein the connection requests occur within at least one of the following: one or more Internet Key Exchange v1 exchanges, one or more Internet Key Exchange v2 exchanges, one or more Kerberized Internet Negotiation of Keys exchanges.

15. The configured computer-readable storage medium of claim 11, wherein the method is further characterized in that node X employs a first security association for outgoing traffic to network node Y, and node X employs a second security association for incoming traffic from network node Y.

16. The configured computer-readable storage medium of claim 11, wherein the method further comprises:

network node X selecting an INIT phase secure connection result from among at least two INIT phase secure connection results; and then network node X using the selected INIT phase secure connection result in a subsequent AUTH phase secure connection exchange with network node Y.

17. The configured computer-readable storage medium of claim 11, wherein the method is further characterized in that the connection requests occur within at least one of the following: one or more Internet Key Exchange v1 exchanges, one or more Internet Key Exchange v2 exchanges, one or more Kerberized Internet Negotiation of Keys exchanges.

18. The computing system of claim 6, wherein the secure connection software of node X upon execution performs at least as follows:

node X employs a first security association for outgoing traffic to network node Y; and node X employs a second security association for incoming traffic from network node Y.

19. The computing system of claim 6, further characterized in that the connection requests occur within at least one of the following: one or more Internet Key Exchange v1 exchanges, one or more Internet Key Exchange v2 exchanges, one or more Kerberized Internet Negotiation of Keys exchanges.

20. The computing system of claim 6, further characterized in that at least one of the network nodes operates as a server.

* * * * *